US010878459B2

(12) United States Patent
Shusterman

(10) Patent No.: US 10,878,459 B2
(45) Date of Patent: Dec. 29, 2020

(54) OPTIMIZED COMPUTING SYSTEM FOR FACILITATING THE TRANSITION FROM A CO-OP MODEL

(71) Applicant: SproutLoud Media Networks, LLC, Sunrise, FL (US)

(72) Inventor: Jared Shusterman, Sunrise, FL (US)

(73) Assignee: SproutLoud Media Networks, LLC, Sunrise, FL (US)

(*) Notice: Subject to any disclaimer, the term of this patent is extended or adjusted under 35 U.S.C. 154(b) by 602 days.

(21) Appl. No.: 15/593,073

(22) Filed: May 11, 2017

(65) Prior Publication Data

US 2017/0330242 A1    Nov. 16, 2017

Related U.S. Application Data

(60) Provisional application No. 62/334,599, filed on May 11, 2016.

(51) Int. Cl.
*G06Q 30/02* (2012.01)
(52) U.S. Cl.
CPC ..... *G06Q 30/0273* (2013.01); *G06Q 30/0242* (2013.01)
(58) Field of Classification Search
CPC .................................................. G06Q 30/0273
USPC ....................................................... 705/14.16
See application file for complete search history.

(56) References Cited

U.S. PATENT DOCUMENTS

| | | | | |
|---|---|---|---|---|
| 9,934,537 | B2* | 4/2018 | Berland | G06Q 50/01 |
| 2007/0005424 | A1* | 1/2007 | Arauz | G06Q 30/0214 |
| | | | | 705/14.16 |
| 2009/0094108 | A1* | 4/2009 | Bhandari | G06Q 30/02 |
| | | | | 705/14.73 |

* cited by examiner

*Primary Examiner* — Azam A Ansari
(74) *Attorney, Agent, or Firm* — Akerman LLP; Mammen (Roy) P. Zachariah, Jr.

(57) ABSTRACT

A change management system for facilitating a marketing partner's transition from a reimbursement co-op model to a co-pay co-op model is disclosed. In particular, the system may incorporate an existing reimbursement co-op process utilized by a brand into a software platform. The reimbursement co-op process may enable a marketing partner to request pre-approval for a marketing activity or submit a claim for reimbursement for marketing activities performed for the brand. The system may also incorporate a co-pay co-op process into the software platform that includes pre-approved and pre-loaded marketing campaigns and assets for the brand. The marketing partner may be given the option to participate in the reimbursement co-op process or the co-pay co-op process to obtain reimbursements for performing marketing activities for the brand. The system may facilitate selection of the co-pay co-op process by providing greater incentives for selecting the co-pay co-op process versus the reimbursement co-op process.

20 Claims, 18 Drawing Sheets

200

♕SampleCo  [Search assets, documents 🔍] [○] [▲]

Claims, Submissions and Co-pay Orders  < Go Back
Click to learn how Co-Pay increases reimbursement amounts
Introducing the new DirectConnect program, where Car Dealer marketing just got a whole lot easier
Co-branded local marketing and advertising products are now available for direct purchase, through DirectConnect. Each activity or purchase qualifies for 100% usage of Co-op funds up-front and with no pre-approvals or claim submissions needed.
Don't be alarmed, any Dealer created marketing activity coordinated outside of DirectConnect can still qualify for reimbursements based on the Car company Marketing Guidelines, but you will need to go through the Pre-approval and Claims process.

[ Submit a Claim ]  [ Submit Pre-approval ]  [ View Existing Claims and Approvals ]

Claims & Submissions     X

Are you ready to Save Money on your Marketing?
Starting on December 1, 2015. Any purchase from our pre-approved catalog of marketing activities and tactics will *increase your reimbursement rate by 25%*

Traditional Reimbursement vs The New Co-Pay

See the Co-Pay Advantage for:

[ All Order Types ▼ ] [ View All Pre-Approved Items ]

Traditional Reimbursement
Call local marketer
Pay for 100% of marketing out of pocket
Obtain proof of marketing
Fill out lots of forms
Wait for approval
Wait for reimbursement check to arrive
Reimbursement rate = 50%

Co-Pay
No forms
Everything is Pre-approved!
No waiting - savings are applied instantly.
Reimbursement rate = 75%

[ Close ]

Claims & Submissions      X

Are you ready to Save Money on your Marketing?
Starting on December 1, 2015. Any purchase from our pre-approved catalog of marketing activities and tactics will *increase your reimbursement rate by 25%*

Traditional Reimbursement vs The New Co-Pay
See the Co-Pay Advantage for:

| Direct Mail ▼ | View All Pre-Approved Items |

All Order Types
Call Tracking
Co-Op
Community Outreach
Custom Ads
Direct Mail
Download Center
Email
Local PR
Marketing Programs
Outdoor Advertising
Purchase a List
Radio
Ship to Your Door
Social
Television Co-Pay
No forms
Everything is Pre-approved!
No waiting - savings are applied instantly.
Reimbursement rate = 75%

[Close]

Claims & Submissions  X

Are you ready to Save Money on your Marketing?
Starting on December 1, 2015. Any purchase from our pre-approved catalog of marketing activities and tactics will *increase your reimbursement rate by 25%*

Traditional Reimbursement vs The New Co-Pay

See the Co-Pay Advantage for:
[Direct Mail ▼] [View All Direct Mail Items]

Traditional Reimbursement
Call local marketer
Pay for 100% of marketing out of pocket
Obtain proof of marketing
Fill out lots of forms
Wait for approval
Wait for reimbursement check to arrive
Reimbursement rate = 50%

Co-Pay
No forms
Everything is Pre-approved!
No waiting - savings are applied instantly.
Reimbursement rate = 75%

[Close]

FIG. 6

SampleCo   [Search assets, documents]

Claims, Submissions and Co-pay Orders                 < Go Back
Click to learn how Co-Pay increases reimbursement amounts
Introducing the new DirectConnect program, where Car Dealer marketing just got a whole lot easier
Co-branded local marketing and advertising products are now available for direct purchase, through DirectConnect. Each activity or purchase qualifies for 100% usage of Co-op funds up-front and with no pre-approvals or claim submissions needed.
Don't be alarmed, any Dealer created marketing activity coordinated outside of DirectConnect can still qualify for reimbursements based on the Car company Marketing Guidelines, but you will need to go through the Pre-approval and Claims process.

[Submit a Claim]  [Submit Pre-approval]     [Place Orders & Customize]
              50%                                75%
         Reimbursement                      Reimbursement Get 25% more when you use Co-Pay and Shop Online

Call Tracking
Use call tracking numbers in your marketing pieces to analyze how well they are performing

Co-op
Submit Co-op for Approval and Reimbursement

Community Outreach
Customize and order grassroots outreach support to promote awareness through groups.

Custom Ads
Customize an advertisement for use in print publications – i.e. magazines, newspapers, etc.

Direct Mail
Create and schedule direct mail communications to your customers or purchased lists.

Download Center
Search from an online catalog of files for download to your computer.

Email
Create and schedule e-mail communications to your customers.

Local PR
Customize and order public relations support to enhance visibility.

Marketing Programs
Set-it-and-forget-it automated programs to make targeted marketing easier.

Outdoor Advertising
Create large ads used for outdoor public display advertising like billboards and bus stops.

Purchase a List
Purchase a list of direct mail and/or telemarketing prospects in your area.

Radio
Customize and order advertising services, from production to placement.

Ship to your Door
Ship marketing materials and company store items directly to you, or anywhere else you need them.

Social
Select, edit, and manage content to be posted to your social account(s).

Television
Customize and order advertising services, from production to placement.

SampleCo    [Search assets documents] 🔍 ◯ △

Reimbursement Request    Details    Go Back

Set up your request

Name your request
[My new request]

Vendor name
[Vendor XYZ]

Request Information

Invoice Number
[2348234098234]
This invoice is currently in use on another request Invoice Date
[6/6/2015] 📅

Media/Activity Type
[ ▽ ]

Dates of ad activity
[6/18/2015] 📅   [8/6/2015] 📅
Start    End

Invoice Amount
[$ ]

Claimed amount
[$ ]
Current balance: $500

Select Apply Fund
[ ▽ ]
| 50% of Direct Mail assets |
| 75% of Direct Mail assets |
| $100 of Ship to your door assets |

Reimbursement pending amount
[$ ]

Master custom field 2
[ ]

Master Custom Select
[ ▽ ]

Attach Files

Attach support documentation (PDF & JPG are supported)

| DRAG & DROP FILES HERE OR... | [ Browse for files ] |

HVAC_Invoice.pdf    Select file type   [Vendor Invoice Type ▽]    Remove
HVAC_image.pdf    Select file type    Remove

- Distributor Invoice
- Vendor Invoice
- Tear Sheet
- Other supporting info
- Master editable type

Notifications and comments

Attach Pre-approved Request
[Select pre-approved request ▽]

Search by reference ID or request name
| Name of order here | Ref ID: 23482340283484 |
| Name of order here | Ref ID: 23482340283484 |
| Name of order here | Ref ID: 23482340283484 |

[ Submit ]   Cancel

Reimbursement Summary (DENIED PENDING)   Go Back

| Details | History |

| | |
|---|---|
| Approved Amount | $800 |
| Denied Amount *Reimbursed amount less approved amount* | $0 |
| Paid Amount | $500 |
| Paid Date | 5/17/2015 |
| Paid Check Number | 12312371 |
| Cleared Check Date | 6/6/2015 |

| | |
|---|---|
| Network | XYZ Sellers |
| Reference ID | ID 234923482344 |
| Request Name | Reimbursement Program |
| Vendor Name | Vendor Name |
| Order Type | Direct mail |
| Invoice Number | #234234823402834 |
| Invoice Date | 5/9/2015 |
| Dates of Activity | 6/6/2015 - 8/8/2015 |
| Invoice Amount | $808.76 |
| Claimed Amount | $600 |
| Reimbursement Amount | $600 |
| Master custom field 1 | Master custom field 1 |
| Pre-approved Reference | Name of order  Ref ID: 23482304824 |
| Send status updates to: | test@sproutloud.com |
| Comments | |
| Attached Files | HVAC_invoice.pdf    Vendor Invoice |
| | HVAC_image.pdf     Creative |

Delete

Reimbursement Summary (DENIED PENDING)     Go Back

Details | History

| | |
|---|---|
| Request status is Denied - Pending. Please review the comments below, make necessary changes and resubmit your request | |
| Status Comments | Comments appear here. These comments are simulating in place comments |
| Network | XYZ Sellers |
| Reference ID | ID 234923482344 |
| Request Name | Reimbursement Program |
| Vendor Name | Vendor Name |
| Media/Activity Type | Direct mail |
| Invoice Number | #234234823402834 |
| Invoice Date | 5/9/2015 |
| Dates of Activity | 6/6/2015 - 8/8/2015 |
| Invoice Amount | $808.76 |
| Claimed Amount | $600 |
| Reimbursement Amount | $200 |
| Master custom field 1 | Master custom field 1 |
| Pre-approved Reference | Name of order  Ref ID: 23482304824 |
| Send status updates to: | test@sproutloud.com |
| Comments | |
| Attached Files | HVAC_invoice.pdf    Vendor Invoice<br>HVAC_image.pdf    Creative |

[ Edit ]      [ Delete ]

Reimbursement Summary  (PAID & CHECK CLEARED)   Go Back

| | Details | History | |
|---|---|---|---|

| Status | Date & Time | Author | Comments |
|---|---|---|---|
| Pending Approval | 6/6/2015 @ 10am | John Carbunkle | Lorem ipsum dolor sit amet, consetetur sadipscing elitr, sed diam nonumy eirmod tempor invidunt ut labore et dolore magna aliquyam erat, sed diam voluptua. At vero eos et accusam et justo duo dolores et ea rebum. |
| Denied - Pending | 6/6/2015 @ 10am | John Carmichael | Lorem ipsum dolor sit amet, consetetur sadipscing elitr, sed diam nonumy eirmod tempor invidunt ut labore et dolore magna aliquyam erat, sed diam voluptua. At vero.. |
| Approval | 6/6/2015 @ 10am | John Carmichael | |
| Paid | 6/6/2015 @ 10am | John Carmichael | |

Co-op Preapproval Request

Go Back

Set up your request

Name your request
[ My new request ]

Vendor name
[ Vendor XYZ ]

Media, Activity or Event

Media/Activity Type
[ ▽ ]

Dates of ad activity
[ 6/18/2015 ▦ ]  [ 8/6/2015 ▦ ]
Start                End

Additional Info

Master custom field 1
[                    ]

Master custom field 2
[                    ]

Master custom select
[ ▽ ]

Attach Files

Attach support documentation (PDF & JPG are supported

| DRAG & DROP FILES HERE OR... | Browse for files |

| HVAC_Invoice.pdf | Select file type | Vendor Invoice Type ▽ | Remove |
| HVAC_image.pdf | Select file type | Distributor Invoice<br>Vendor Invoice<br>Tear Sheet<br>Other supporting info<br>Master editable type | Remove |

Notifications and comments

Send status updates to additional emails
[                    ]
Use commas to seperate email addresses Comments
[                    ]

[ Submit ]  Cancel

Reimbursement Pre-approval  (DENIED PENDING)   Go Back

Details | History

| | |
|---|---|
| Request status is Denied - Pending. Please review the comments below, make necessary changes and resubmit your request ||
| Status Comments | Comments appear here. These comments are simulating in place comments |

| | |
|---|---|
| Network | XYZ Sellers |
| Reference ID | ID 234923482344 |
| Request Name | Reimbursement Program |
| Vendor Name | Vendor Name |
| Media/Activity Type | Direct mail |
| Dates of Activity | 6/6/2015 - 8/8/2015 |
| Total Amount | $1000 |
| Requested Fund Amount | $400 |
| Additional Comments | This would be more information about the request for funds reimbursement |
| Master custom field 1 | test@sproutloud.com |
| Send status updates to: | |
| Comments | |
| Attached Files | HVAC_invoice.pdf<br>HVAC_image.pdf |

[ Edit ]                                            [ Delete ]

Request Incremental Funds

Go Back

Set up your request

Name your request
[My new request]

Vendor name
[Vendor XYZ]

Request Information

Media/Activity type
[-Select- ▼]

Dates of activity
[06/06/2015] [08/06/2015]
Start                End

Total amount
[$        ]

Requested fund amount
[$        ]

More details for this request
[                    ]

Additional Info

Master custom field 1
[        ]

Master custom field 2
[        ]

Master custom Select
[        ▽]

Notifications and comments

Send status updates to additional emails
[                    ]
Use commas to seperate email addresses Comments
[                    ]

[Submit]  Cancel

*FIG. 15*

Reimbursement and Co-Op Request

| Reimbursements | Co-op Fund Requests | Pre-approval Requests |

Create New Reimbursement    [Status ▼]    [Search]    [Apply]

| Request Name | Request Type | Submit Date | Total Amount | Fund Request Amount | Status | Actions |
|---|---|---|---|---|---|---|
| Name of Request<br>Ref ID 234293048 | Vendor | 10/14/2014 | $700.00 | $650.00 | Pending Approval | [Actions ▶]<br>View Details<br>Edit<br>Delete |
| Name of Request<br>Ref ID 234293048 | Distributer | 10/10/2014 | $700.00 | $500.00 | Approved | |
| Name of Request<br>Ref ID 234293048 | Distributer | 10/10/2014 | $700.00 | $20.00 | Denied - Closed | [Actions ▶] |
| Name of Request<br>Ref ID 234293048 | Distributer | 10/10/2014 | $700.00 | $200.00 | Denied - Pending | [Actions ▶] |
| Name of Request<br>Ref ID 234293048 | Distributer | 10/10/2014 | $700.00 | $250.00 | Paid | [Actions ▶] |
| Name of Request<br>Ref ID 234293048 | Distributer | 10/10/2014 | $700.00 | $500.00 | Completed | [Actions ▶] |

FIG. 16

OPTIMIZED COMPUTING SYSTEM FOR FACILITATING THE TRANSITION FROM A CO-OP MODEL

CROSS REFERENCE TO RELATED APPLICATIONS AND PRIORITY

This application claims priority to and the benefit of U.S. Provisional Patent Application No. 62/334,599, filed on May 11, 2016, which is hereby incorporated by reference in its entirety.

FIELD OF THE INVENTION

The present application relates to management technologies, marketing resource management technologies, computer resource optimization technologies, and more particularly, to a system and method for facilitating the transition from a co-op model, particularly with regard to various aspects of marketing technologies.

BACKGROUND

In today's society, businesses and individuals have become increasingly comfortable with utilizing software-based technologies to promote and market various types of brands in an expeditious and efficient manner. As an example, a company having a brand may employ the use of a sophisticated web portal to provide local marketers, affiliates, individuals, and partner companies ("marketing partners") with online access to marketing resources associated with the brand. Such marketing resources may include, but are not limited to, marketing materials, marketing guidelines, marketing programs, catalogs, direct mail resources, electronic mail marketing resources, social media marketing resources, advertisements, marketing development funds ("MDF"), and other marketing resources. The local marketers, affiliates, individuals, and partner companies may access and utilize the marketing materials to promote the brand, along with any products and/or services associated with the brand. The rules, guidelines, and details surrounding the approved use of the brands marketing materials are often dictated by cooperative advertising programs ("co-op programs" and/or "co-op processes") developed by the companying having the brand. Such co-op programs typically entail having the company with the brand financially reimburse claims from the local marketers, affiliates, individuals, and partner companies for their willingness to include and promote the brand in their advertising campaigns.

While traditional co-op programs and processes (e.g. reimbursement co-op processes) offer substantial benefits to both brands and the brand's marketing partners, traditional co-op programs and processes may be inefficient and may cause issues between the brand and the brand's marketing partners. As an initial example, marketing partners often try to create marketing materials according to the brands requirements as detailed in the co-op program. Such requirements are often unclear, and, as a result, marketing materials created by marketing partners may often go through two to three rounds of creative review before the brand finally approves the marketing materials. As another example, if a marketing partner does not happen to follow the guidelines outlined by the co-op program, the company with the brand may reject a claim for reimbursement for marketing expenses incurred by the marketing partner to promote the brand. Additionally, depending on how long it takes for the company with the brand to reimburse the marketing partner, the marketing partner often has to advance the entire expenses associated with the marketing campaign up front in the hopes of getting reimbursed. When marketing partners are out-of-pocket for the full amount of the expenses, the marketing partners may not have enough cash flow to participate in other marketing campaigns. This may result in the marketing partner reducing the amount of marketing activities the marketing partner conducts for the brand until the marketing partner gets reimbursed.

Notably, traditional co-op programs (e.g. reimbursement co-op programs) may cause still further issues between brands and marketing partners. For example, the company with the brand may lose visibility of the performance of the marketing campaign and activities conducted by the marketing partners because performance metrics are often only available to the marketing partners and are typically not included with reimbursement claims submitted by marketing partners. Also, marketing partners often have to fill out numerous forms, obtain proof of marketing to obtain reimbursements, wait for approval for generated marketing materials or claims, wait for the actual reimbursement to arrive from the company with the brand, and go through numerous other tedious steps as required in the co-op process. Still further, the company with the brand often has to staff entire teams just for reviewing claims, processing paperwork, verifying brand compliance, and approving marketing materials submitted by marketing partners. As a result, marketing processes and systems may be improved so as to provide greater efficiencies, increased visibility as to the performance of various marketing programs, strengthened marketing partner and brand relationships, and increased financial savings.

SUMMARY

A system and accompanying methods for facilitating a marketing partner's transition from a reimbursement co-op model to a co-pay co-op model are disclosed. In particular, the system and methods provide for a software platform that implements a novel co-pay co-op process side-by-side with a traditional reimbursement co-op process in order to facilitate a marketing partner's transition from using the reimbursement co-op process to obtain approval and reimbursement for marketing activities to the novel co-pay co-op process, which provides the marketing partner with immediate access to pre-approved marketing materials and marketing funds. In order to accomplish the foregoing, the system and methods may include integrating a reimbursement co-op process utilized by a company having a brand ("a brand") into a software platform. For example, the software platform may be utilized to mirror an existing reimbursement co-op process utilized by the brand to approve reimbursement claims for marketing activities performed by marketing partners and/or approve marketing materials created by the marketing partners. Additionally, the software platform may integrate a novel co-pay co-op process/model, which may allow for marketing campaigns and assets of the brand to be pre-loaded onto the software platform. Notably, for the co-pay co-op process, the marketing campaigns and assets may be already pre-approved by the brand and may be already compliant with the brands co-op programs and guidelines. The co-pay co-op process may enable a brand to distribute accrued marketing funds to marketing partners in real-time, along with pre-approved brand marketing content. In other words, the co-pay co-op process joins together pre-approved brand marketing content and pre-authorized marketing funds and enables a marketing partner to immediately access both the marketing content and funds.

The software platform may present, side-by-side, both the reimbursement co-op process and the co-pay co-op process to a marketing partner as potential options for participating in marketing efforts on behalf of the brand. In order to incentivize a marketing partner to select the co-pay co-op process option, the software platform may increase reimbursement percentages associated with performing marketing activities using the co-pay co-op process and reduce reimbursement percentages associated with expenses incurred performing marketing activities using the traditional reimbursement co-op process. For example, if a marketing partner wants to perform (or has already performed) a direct mail marketing activity, when the marketing partner goes to submit a reimbursement claim or request pre-approval for the direct mail marketing activity, the software platform may display a 50% reimbursement percentage rate if the marketing partner proceeds using the reimbursement co-op process and a 75% reimbursement percentage rate if the marketing partner decides to proceed with the co-pay co-op process. Additionally, the software platform may display a side-by-side comparison of the advantages of using the co-pay co-op process versus the traditional reimbursement co-op process, along with various types of incentives. Furthermore, the systems and methods may be utilized, such as via the software platform, to collect data indicating which marketing partners selected the co-pay co-op process and to determine which marketing programs and activities are most effective in promoting the brand and increasing the sales of the brand's products. As a result, the systems and methods facilitate a marketing partner's transition from using a traditional reimbursement co-op process/model to a co-pay co-op process/model and provide insight into the performance of various marketing programs utilized to promote the brand.

In one embodiment, a system for facilitating a marketing partner's transition from a traditional reimbursement co-op model to a co-pay co-op model is disclosed. The system may include a memory that stores instructions and a processor that executes the instructions to perform various operations of the system. The system may perform an operation that includes incorporating, into a software platform, a reimbursement co-op process utilized by a brand. For example, existing software utilized to execute a reimbursement co-op process utilized by the brand may be incorporated into the code of the software platform of the system. As another example, functionality that mimics or otherwise contains similar functionality to the reimbursement co-op process utilized by the brand may be incorporated into the software platform. The system may then perform an operation that includes providing, to a partner device and via the software platform, a first option to participate in the reimbursement co-op process so as to obtain pre-approval to perform certain marketing activities and/or to obtain a reimbursement of a claim associated with a first marketing activity already performed for the brand by the marketing partner. Additionally, the system may perform an operation that includes providing, to the partner device, a first percentage rate for the reimbursement of the claim associated with performing the first marketing activity for the brand for the reimbursement co-op process. Furthermore, the system may perform an operation that includes providing, to the partner device and via the software platform, a second option to participate in a co-pay co-op process associated with performing a second marketing activity that is pre-approved by the brand. The second marketing activity may be the first marketing activity or a different marketing activity. Moreover, the system may perform an operation that includes providing, to the partner device, a second percentage rate associated with reimbursement for performing the second marketing activity that is pre-approved by the brand. The second percentage rate may be different from the first percentage rate. Notably, the second reimbursement rate provided may be greater than the first reimbursement rate so as to provide an incentive for the marketing partner to select the co-pay co-op process over the reimbursement co-op process. Finally, the system may perform an operation that includes receiving, from the partner device, a selection of the first option or the second option.

In another embodiment, a method for facilitating a marketing partner's transition from a reimbursement co-op model to a co-pay co-op model is disclosed. The method may include utilizing a memory that stores instructions, and a processor that executes the instructions to perform the various functions of the method. The method may include incorporating, into a software platform, a reimbursement co-op process utilized by a brand. The reimbursement co-op process may be a software process that is inserted or otherwise incorporated into the software platform. In certain embodiments, functionality that mimics or otherwise contains similar functionality to the reimbursement co-op process utilized by the brand may be incorporated into the software platform. The method may also include providing, to a partner device and via the software platform, a first option to participate in the reimbursement co-op process so as to obtain pre-approval to perform certain marketing activities and/or to obtain a reimbursement of a claim associated with performing a first marketing activity for the brand. Additionally, the method may include providing, to the partner device, a first percentage rate for the reimbursement of the claim associated with performing the first marketing activity for the brand. Furthermore, the method may include providing, to the partner device and via the software platform, a second option to participate in a co-pay co-op process associated with performing a second marketing activity that is pre-approved by the brand. Moreover, the method may include providing, to the partner device, a second percentage rate associated with reimbursement for performing the second marketing activity that is pre-approved by the brand. The first percentage rate may be different from the first percentage rate. Notably, the second percentage rate may be made greater than the first percentage rate so as to incentivize the selection of the co-pay co-op process over the reimbursement co-op process. Finally, the method may include receiving, from the partner device, a selection of the first option or the second option.

According to yet another embodiment, a computer-readable device having instructions for facilitating a marketing partner's transition from a reimbursement co-op model to a co-pay co-op model is provided. The computer instructions, which when loaded and executed by a processor, may cause the processor to perform operations including: incorporating, into a software platform, a reimbursement co-op process utilized by a brand; providing, to a partner device and via the software platform, a first option to participate in the reimbursement co-op process so as to obtain a reimbursement of a claim associated with performing a first marketing activity for the brand; providing, to the partner device, a first percentage rate for the reimbursement of the claim associated with performing the first marketing activity for the brand for the reimbursement co-op process; providing, to the partner device and via the software platform, a second option to participate in a co-pay co-op process associated with performing a second marketing activity that is pre-approved by the brand, wherein the second marketing activity is either the first marketing activity or a different marketing activity; providing, to the partner device, a second percentage rate associated with reimbursement for performing the second marketing activity that is pre-approved by the brand for the co-pay co-op process, wherein the second percentage rate is different than the first percentage rate; and receiving, from the partner device, a selection of the first option or the second option.

These and other features of the systems and methods for facilitating a marketing partner's transition from a traditional reimbursement co-op model to a co-pay co-op model are described in the following detailed description, drawings, and appended claims.

BRIEF DESCRIPTION OF THE DRAWINGS

FIG. 2 is a web page generated by a software platform of the system of FIG. 1 that enables marketing partners of a brand to submit reimbursement claims and/or submit marketing materials for pre-approval by the brand.

FIG. 4 is a web page generated by a software platform of the system of FIG. 1 that illustrates advantages, such as higher reimbursement rates associated with selecting a co-pay co-op model process versus a traditional reimbursement co-op model process.

FIG. 5 is a web page providing an option to a marketing partner to select a specific marketing-related activity so as to enable the marketing partner to view the advantages of the co-pay co-op model process versus the traditional reimbursement co-op model process for the specific marketing-related activity selected.

FIG. 6 is a web page the illustrates the specific advantages of the co-pay co-op model process versus the traditional reimbursement co-op model process for the specific marketing-related activity selected on the web page of FIG. 5.

FIG. 7 is a web page generated by a software platform of the system of FIG. 1 that provides marketing partners with an option to select pre-approved marketing materials that pre-qualify for marketing funds provided by a brand or with an option to submit reimbursement claims and/or submit marketing materials for pre-approval by the brand.

FIG. 8 is a web page selecting a sample web-based form that is displayed to a marketing partner if the marketing partner selects the option to submit a reimbursement claim on the web page of FIG. 7.

FIG. 9 is a web page illustrating reimbursement details relating to a marketing activity performed by a marketing partner.

FIG. 10 is a web page illustrating a denial of a request for reimbursement.

FIG. 11 is a web page showing a history of reimbursements made by a marketing partner of a brand.

FIG. 12 is a web page illustrating a sample web-based form that is displayed to a marketing partner if the marketing partner selects an option to request pre-approval from a brand for one or more marketing materials.

FIG. 14 is a web page illustrating details relating to a marketing activity that has been denied approval by a brand in response to a request for pre-approval made by a marketing partner.

FIG. 15 is a web page illustrating a request for incremental funds for performing one or more marketing activities.

FIG. 16 is a web page illustrating the status of several reimbursement requests entered into the software platform of the system of FIG. 1.

DETAILED DESCRIPTION OF THE INVENTION

Figure 1:
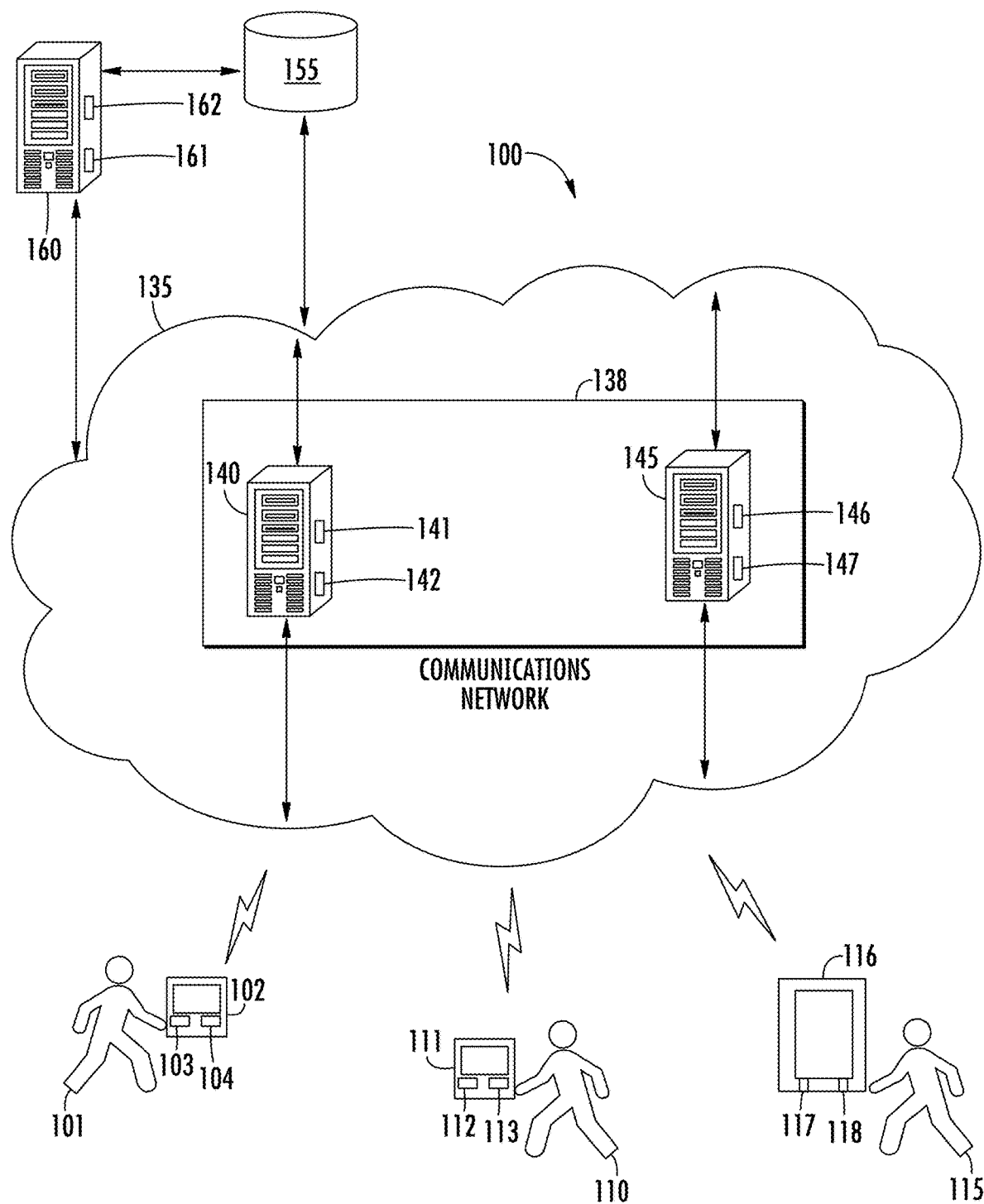
FIG. 1 is a schematic diagram of a system for facilitating a marketing partner's transition from a reimbursement co-op model to a co-pay co-op model according to an embodiment of the present disclosure.
Figure 3:
FIG. 3 is a web page generated by a software platform of the system of FIG. 1 that illustrates a comparison of a reimbursement co-op process versus a co-pay co-op process, and that enables marketing partners to select pre-approved marketing materials that pre-qualify for marketing funds provided by a brand.

A system 100 and accompanying methods for facilitating a marketing partner's transition from a traditional reimbursement co-op model to a co-pay co-op model are disclosed. In particular, the system 100 and methods provide for a software platform that implements a novel co-pay co-op process side-by-side with a traditional reimbursement co-op process in order to facilitate a marketing partner's transition from using the reimbursement co-op process to obtain approval and reimbursement for marketing activities to the novel co-pay co-op process, which provides the marketing partner with immediate access to pre-approved marketing materials and marketing funds. In order to accomplish the foregoing, the system 100 and methods may include integrating a traditional reimbursement co-op process utilized by a brand into a software platform. For example, the software platform may be utilized to mirror an existing reimbursement co-op process utilized by the brand to approve reimbursement claims for marketing activities performed by marketing partners and/or approve marketing materials created by the marketing partners to market the brand's products or services. Additionally, the software platform may integrate a novel co-pay co-op process/model, which may allow for marketing campaigns and assets of the brand to be pre-loaded onto the software platform. Notably, for the co-pay co-op process, the marketing campaigns and assets may be already pre-approved by the brand and may be already compliant with the brands co-op programs. The co-pay co-op process may enable a brand to distribute accrued marketing funds to marketing partners in real-time, along with pre-approved brand marketing content. In other words, the co-pay co-op process joins together pre-approved brand marketing content and pre-authorized marketing funds and enables a marketing partner to immediately access both the marketing content and funds without having to deal with the lengthy approval process required under traditional reimbursement co-op processes.

The software platform may present, side-by-side, both the reimbursement co-op process and the co-pay co-op process to a marketing partner as potential options for participating in marketing efforts on behalf of the brand. In order to incentivize a marketing partner to select the co-pay co-op process option, the software platform may increase reimbursement percentages associated with performing marketing activities using the co-pay co-op process and reduce reimbursement percentages associated with expenses incurred performing marketing activities using the traditional reimbursement co-op process. For example, if a marketing partner wants to perform an online marketing activity, when the marketing partner goes to submit a reimbursement claim or request pre-approval for the online mail marketing activity, the software platform may display a 40% reimbursement rate if the marketing partner proceeds using the reimbursement co-op process and a 90% reimbursement rate if the marketing partner decides to proceed with the co-pay co-op process. Additionally, the software platform may display a side-by-side comparison of the advantages of using the co-pay co-op process versus the traditional reimbursement co-op process, along with other types of incentives. Furthermore, the system 100 and methods may be utilized, such as via the software platform, to collect data indicating which marketing partners selected the co-pay co-op process and to determine which marketing programs and activities are most effective in promoting the brand and increasing the sales of the brand's products. As a result, the system 100 and methods facilitate a marketing partner's transition from using a reimbursement co-op process/model to a co-pay co-op process/model and provide insight into the performance of various marketing programs utilized to promote the brand.

As shown in FIG. 1, a system 100 that facilitates the transition from a traditional reimbursement co-op model to a co-pay co-op model is disclosed. The system 100 may be configured to support, but is not limited to supporting, marketing services, marketing software, cloud computing services, media content delivery services, multimedia services, satellite services, marketing funds distribution services, reimbursement co-op services, co-pay co-op services, fiber services, telephone services, voice-over-internet protocol services (VoIP), voice-over-long-term-evolution (VoLTE) services, software as a service (SaaS) applications, social media applications and services, productivity applications and services, mobile applications and services, and any other computing applications and services. The system may include a first user 101 that may utilize a first user device 102 to access and/or provide content, data, and services, or to perform a variety of other functions. As an example, the first user 101 may be a representative of a brand, and the first user 101 may upload various digital marketing materials for a brand, upload guidelines for marketing programs for the brand, upload or download media content associated with the brand, access funds of the brand (e.g. marketing funds), perform any other operations, or any combination thereof. Marketing materials may include, but are not limited to, direct mail advertising materials, co-op marketing materials, e-mail advertising materials, information relating to outdoor marketing materials, radio advertising materials, television advertising materials, public relations materials, marketing program materials, any other type of marketing materials, or any combination thereof. Media content may include, but is not limited to, audio content, video content, image content, web content, text content, any type of content, or any combination thereof. In certain embodiments, the media content may be static content, dynamic content, or a combination of static and dynamic content.

In certain embodiments, the first user 101 may utilize the first user device 102 to interact with a web portal generated by a software platform of the system 100. The web portal may be website, a web resource, a software application, or any combination thereof. The web portal may include a graphical user interface that may enable the first user 101 or other users to readily access and utilize the features provided by the software platform. In certain embodiments, the first user device 102 may be equipped for mobile communication. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. In certain embodiments, the first user device 102 may be a computer, a laptop, a tablet device, a phablet, a server, a mobile device, a smartphone, a smart watch, or any other type of computing device. Illustratively, the first user device 102 is shown as a mobile device in FIG. 1. In certain embodiments, the first user device 102 may communicate with second user device 111, third user device 116, other devices in the system 100, or any combination thereof, by utilizing any type of wireless protocol, radio technologies, or any combination thereof.

In addition to including the first user 101 and the first user device 102, the system 100 may also include a second user 110 that may utilize a second user device 111 to access and/or provide content, data, and services, or to perform a variety of other functions. The second user 110 may be a representative of a first marketing partner of the brand, and may utilize the second user device 111 to interact with the web portal generated by the software platform. For example, the second user 110 may be a marketer of the first marketing partner that may utilize the second user device 111 to access (if the second user 110 is authorized to do so) any of the marketing programs, marketing content, marketing funds, and/or any information provided by the brand via the web portal. Much like the first user device 102, the second user device 111 may also be equipped for mobile communication. In certain embodiments, the second user 110 may utilize the second user device 111 to communicate with the first user device 102 of the first user 101, such as via a telephone call, instant message, text message, or other communication methodology. The second user device 111 may include a memory 112 that includes instructions, and a processor 113 that executes the instructions from the memory 112 to perform the various operations that are performed by the second user device 112. In certain embodiments, the processor 113 may be hardware, software, or a combination thereof. In certain embodiments, the second user device 111 may be a computer, a laptop, a tablet device, a phablet, a server, a mobile device, a smartphone, a smart watch, or any other type of computing device. Illustratively, the second user device 111 is shown as a mobile device in FIG. 1. In certain embodiments, the second user device 111 may communicate with the first user device 102, the third user device 116, other devices in the system 100, or any combination thereof, by utilizing any type of wireless protocol, radio technologies, or any combination thereof.

The system may also include a third user 115 that may utilize a third user device 116 to access and/or provide content, data, and services, or to perform a variety of other functions. The third user 115 may be a representative of a second marketing partner of the brand, and may utilize the third user device 116 to interact with the web portal generated by the software platform. For example, the third user 115 may be a marketer of the second marketing partner that may utilize the third user device 116 to access (if the third user 115 is authorized to do so) any of the marketing programs, marketing content, marketing funds, and/or any information provided by the brand via the web portal. Much like the first and second user devices 102, 111, the third user device 116 may also be equipped for mobile communication. In certain embodiments, the third user 115 may utilize the third user device 116 to communicate with the first user device 102 of the first user 101 (or the second user device 111 of the second user 110), such as via a telephone call, instant message, text message, or other communication methodology. The third user device 116 may include a memory 117 that includes instructions, and a processor 118 that executes the instructions from the memory 117 to perform the various operations that are performed by the third user device 116. In certain embodiments, the processor 118 may be hardware, software, or a combination thereof. In certain embodiments, the third user device 116 may be a computer, a laptop, a tablet device, a phablet, a server, a mobile device, a smartphone, a smart watch, or any other type of computing device. Illustratively, the third user device 116 is shown as a tablet device in FIG. 1. In certain embodiments, the third user device 116 may communicate with the first user device 102, the second user device 111, other devices in the system 100, or any combination thereof, by utilizing any type of wireless protocol, radio technologies, or any combination thereof.

In certain embodiments, the first, second, and third user devices 102, 111, 116 may have any number of software applications and/or application services stored and/or accessible thereon. For example, the first, second, and third user devices 102, 111, 116 may include cloud-based applications, web-based browser applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications and services may include one or more graphical user interfaces so as to enable the first, second, and third users 101, 110, 115 to readily interact with the software applications. The software applications and services may also be utilized by the first, second, and third users 101, 110, 115 to interact with the any device in the system 100, any network in the system 100, or any combination thereof. In certain embodiments, the first, second, and third user devices 102, 111, 116 may include associated telephone numbers, device identities, or any other identifiers to uniquely identify the first, second, and third user devices 102, 111, 116.

The system 100 may also include user profiles. A user profile may be a profile corresponding to the first user 101, the second user 110, the third user 115, or any other user. For example, the first user's 101 profile may include information, such as, but not limited to, a name of the first user 101, the age of the first user 101, demographic information associated with the first user 101, information identifying the first user device 102 of the first user 101, information identifying a location of the first user 101, information identifying the brands that the first user 101 is associated with, information identifying the types of marketing resources the first user 101 has made available via the web portal, information identifying marketing programs of the brands associated with the first user 101, information identifying guidelines for the marketing programs, information identifying which marketing partners are partners of the brand, information identifying which marketing partners are authorized to access which marketing resources of the brand, information identifying reimbursement rates available for the performance of marketing activities using the co-pay co-op process, information identifying reimbursement rates available for the performance of marketing activities using the traditional reimbursement co-op process, and any other information. As another example, the second user's 110 profile may include information, such as, but not limited to name information, age information, demographic information, information identifying the second user device 111, information identifying a location of the second user 110, information identifying whether the marketing partner is a partner of the brands associated with the first user 101, information identifying whether the marketing partner is participating in a co-pay co-op process with the brand, information identifying whether the marketing partner is participating in a traditional reimbursement co-op process with the brand, information identifying marketing programs and resources that the marketing partner is authorized to access, and any other information. The user profiles may be stored directly on the first user device 102, the second user device 111, the third user device 116, the database 155, on any other device in the system 100, or on any combination thereof. Additionally, the user profiles may be accessible by any device in the system 100, any network in the system 100, or a combination thereof.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100, and may be configured to support the functionality of the core engine 138 that provides the functionality for the software platform. In certain embodiments, the communications network 135 may include any number of servers, databases, or other componentry, and may be controlled by a service provider. In certain embodiments, the communications network 135 may be subscribed to by the first and second users 101, 110. The communications network 135 may also include and be connected to a radio access network, a cloud-computing network, an IMS network, a VoIP network, a VoLTE network, an LTE network, a wireless network, an Ethernet network, a fiber network, a satellite network, a broadband network, a cellular network, a private network, a cable network, the Internet, an internet protocol network, a multiprotocol label switching (MPLS) network, a content distribution network, an internet protocol television network, any network, or any combination thereof. Illustratively, servers 140, 145 are shown as being included within communications network 135. In certain embodiments, the communications network 135 may be part of a single autonomous system that is located in a particular geographic region, or be part of multiple autonomous systems that span several geographic regions.

In certain embodiments, the communications network 135 may be configured to deliver or receive media content associated with marketing programs, inputs to the web portal of the software platform, outputs from the web portal of the software platform, marketing services, electronic marketing funds, and services using an internet protocol suite and by utilizing packet switching. The communications network 135 may include any number of hardware components that may be utilized to communicate with the first user device 102, the second user device 111, the third user device 116, the server 160, the database 155, any other device, or any combination thereof. Various functionality and services provided by the communications network 135 may be facilitated and/or provided by the core engine 138, which may include any number of servers, such as, but not limited to, servers 140, 145. For example, the core engine 138 may host the software platform utilized to provide the web portal that is accessed by the first user 101, the second user 110, the third user 115, or a combination thereof. The software platform may also include a change management process that serves to facilitate a marketing partner's transition from using a traditional reimbursement co-op process to the novel co-pay co-op process.

Notably, the functionality of the system 100 may be supported and executed by using any combination of the servers 140, 145, and 160. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. In certain embodiments, the servers 140, 145, and 160 may be network servers, routers, gateways, computers, mobile devices or any other suitable computing device. In certain embodiments, the servers 140, 145 may be communicatively linked to the communications network 135, any network, any device in the system 100, or any combination thereof. In certain embodiments, the servers 140, 145 may provide and facilitate the functionality of the core engine 138, which may be utilized to provide the software platform utilized by the brand and the marketing partners.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. Additionally, the database 155, in certain embodiments, may serve as a content source for stored content that may be accessed by the communication network 135 so that the communication network 135 may obtain content for the first, second, and third users 101, 110, 115 in an efficient and effective manner. In certain embodiments, the database 155 may serve as a central repository for content and information requested by the first second, and third users 101, 110, 115. Furthermore, the database 155 may include a processor and memory or be connected to a processor and memory to perform the various operation associated with the database 155.

In certain embodiments, the database 155 may be connected to servers 140, 145, 160, the core engine 138, first user device 102, second user device 111, third user device 116, or any combination thereof. The database 155 may also store information and metadata obtained from the system 100, store media content, store metadata and other information associated with the first, second, and third users 101, 110, 115, store user profiles associated with the first, second, and third users 101, 110, 115, store location information, store communications traversing the system 100, store user preferences, store information associated with any device or signal in the system 100, store information relating to patterns of usage relating to the first, second, and third user devices 102, 111, 116, store content, store mobile versions of media content associated with marketing materials and/or programs, store marketing guidelines and requirements, store different resolutions of media content, store marketing content, store marketing programs, store any type of marketing asset, store information gathered after execution of the reimbursement co-op processes, store information gathered after execution of the co-pay co-op processes, store information indicating which marketing partners selected which co-op processes, store any information traversing the system 100, or any combination thereof. Furthermore, the database 155 may be configured to process queries sent to it by any device in the system 100.

Operatively, the system 100 may facilitate the transition from a traditional reimbursement co-op model to a co-pay co-op model as shown in the following exemplary scenario. In the example scenario, there may be a brand that sells motor vehicles and there may be two marketing partners that perform advertising campaigns and marketing activities to promote the brand and its vehicles and other products. The first user 101 may be a marketing representative (or other individual) of the brand, the second user 110 may be a marketing representative of the first marketing partner of the brand, and the third user 115 may be a marketing representative of the second marketing partner of the brand. The first user 101 may utilize the web portal generated by the software platform to load various marketing assets, marketing programs, marketing guidelines, brand information, and/or any other information and assets into the web portal so that they may be accessed by any number of authorized marketing partners. The software platform may also implement a traditional reimbursement co-op process and a novel co-pay co-op process, which may be selected by the one or more marketing partners via one or more web pages of the web portal.

The second user 110 (i.e. the marketing representative of the first marketing partner) may desire to perform marketing activities on behalf of the brand, participate in a marketing program offered by the brand, or a combination thereof. The second user 110 may utilize second user device 111 to access a web page 200 of the web portal that may provide information on a traditional reimbursement co-op process utilized by the brand, along with information on a co-pay process utilized by the brand. For example, in FIG. 2, web page 200 display information that indicates that the brand allows a marketing partner to access pre-approved and co-branded local marketing and advertising for direct purchase, along with upfront access to co-op funds, if the marketing partners decides to select the co-pay co-op process. Additionally, the web page 200 may indicate that, if the co-pay co-op process is selected, then the marketing partner does not need to submit claim submissions for reimbursements for expenses incurred for marketing activities performed, or need to submit requests to preapprove marketing content. In addition to providing information on the co-pay co-op process, the web page 200 may also providing information on a traditional reimbursement process supported by the brand. In particular, the web page 200 may indicate that the marketing partner may proceed using the traditional reimbursement co-op process, however, if the marketing partner does so, the marketing partner will need to submit a request to the brand to pre-approve marketing materials and/or advertising content created by the marketing partner before the marketing partner can perform marketing activities on behalf of the brand. Additionally, the web page 200 may indicate that if the marketing partner selects the traditional reimbursement co-op process, the marketing partner will also have to go through the claims submission process before any reimbursements are provided to the marketing partner for expenses incurred by the marketing partner for performing marketing activities for the brand.

The second user 110 may also be presented with web page 300, which may indicate an initial side-by-side comparison for the second user 110 depending on whether the second user 110 decides to proceed using the traditional reimbursement co-op process or the co-pay co-op process. In web page 300, the brand may provide a first percentage rate for reimbursement of expenses incurred by the marketing partner if the marketing partner selects the traditional reimbursement co-op process. For example, web page 300 indicates that if the second user 110 selects the option to submit a claim for reimbursement using the traditional reimbursement process or the option to submit marketing materials for pre-approval using the traditional reimbursement process, the percentage rate that the brand is willing to reimburse the marketing partner for expenses incurred for advertising on behalf of the brand amounts to 50%. In certain embodiments, if the second user 110 selects the option to submit a reimbursement claim or submit pre-approval using the reimbursement co-op process, the marketing partner will have to pay or will have already paid for the full amount of advertising expenses incurred while advertising for the brand prior to obtaining any reimbursement. Additionally, if the second user 110 selects the option to submit a reimbursement claim, the first user 101 of the brand may either approve or reject the claim and may require the second user 110 to submit various additional information relating to the claim. If the reimbursement claim is rejected, the second user 110 may have to resubmit the reimbursement claim with corrected and/or updated information that conforms to the brand's reimbursement and/or marketing guidelines. If the reimbursement claim is approved, then the first user 101 may authorize that the marketing partner associated with the second user 110 is to be reimbursed at a rate of 50%.

Similarly, if the second user 110 selects the option to submit a pre-approval for various marketing materials created by the marketing partner to be used in advertising the brand's products, the marketing materials will need to be reviewed by the first user 101 or the system 100 itself to determine if the created marketing materials conform to marketing guidelines of the brand. If the first user 101 or the system 100 rejects the marketing materials submitted under the pre-approval option, the second user 110 will have to modify the marketing materials and re-submit the marketing materials via the web portal for approval again. The marketing materials may be rejected, for example, if the marketing materials do not conform to the marketing guidelines and requirements established by the brand. If the marketing materials are ultimately approved, the marketing partner associated with the second user 110 will still have to pay the full amount of expenses up front for expenses used to create the marketing materials and/or expenses incurred while advertising the brand's products using the marketing materials. The second user 110 will then have to submit a claim for reimbursement and go through the whole approval process with the first user 110 to get the claim for reimbursement approved. In this case, the reimbursement percentage is 50% of the expenses incurred by the marketing partner.

As an alternative to submitting a claim for reimbursement or submitting a pre-approval request to obtain approval for marketing materials, the web page 300 provides the second user 110 with the opportunity to select the option to participate in the co-pay co-op process. If the second user 110 selects the option to participate in the co-pay co-op process, the brand may provide a different percentage rate for reimbursement based on such a selection. For example, as shown in web page 300, the brand provides a higher reimbursement percentage rate of 75% if the marketing partner associated with the second user 110 selects the option to participate in the co-pay co-op process. A higher reimbursement rate percentage may be given to the co-pay co-op process in order to incentivize the marketing partner to choose the co-pay co-op process over the traditional reimbursement co-op process. If the second user 110 opts to select the option to participate in the co-pay co-op process, the second user 110 may proceed to directly order marketing materials that are pre-approved by the brand. Once the second user 110 selects the marketing materials (e.g. direct mail, email advertising, radio advertising, social media advertising, television advertising, outdoor advertising, or other advertising) that the second user 110 wants to use, such as via the web portal, the web portal displays what the marketing partner owes for the marketing materials (i.e. 25% of the expenses). The second user 110 may then pay for 25% of the expenses and the brand may pay for 75% of the expenses. The funds are collected from both the marketing partner associated with the second user 110 and the brand via the web portal and then deposited to a vendor of choice. In this way, the marketing partner associated with the second user 110 does not have to pay the full amount of expenses up front, and, instead, only pays the marketing partner's share of expenses up front. The brand pays for the remaining portion. Additionally, the marketing partner gets immediate access to pre-approved materials without having to go through the pre-approval process separately. The pre-approved materials, which already conform to the brand's marketing guidelines, may be made available directly via the web portal in certain embodiments. Furthermore, the marketing partner does not have to submit a claim for reimbursement because the payment of the expenses is handled up front when using the co-pay co-op process.

In certain embodiments, as shown in web page 400 of FIG. 4, the web portal may provide the option to the second user 110 to see one or more comparisons between the traditional reimbursement co-op process versus the co-pay co-op process for various types order types. For example, in web page 400, various information relating to the traditional reimbursement co-op process is displayed. Such information indicates that if the second user 110 opts to go with the traditional reimbursement co-op process, then the second user 110 will need to call a local marketer regarding advertising to be conducted on behalf of the brand, pay 100% of marketing expenses out of pocket (i.e. prior to getting reimbursed), obtain proof of marketing, fill out various forms to obtain approval for reimbursement claims and/or for approval for marketing materials that the marketing partner wants to use, wait for approval for reimbursement claims and/or approval for the marketing materials, wait for a reimbursement check to be delivered to the marketing partner, along with any other information relating to the reimbursement co-op process. Additionally, the information may indicate the reimbursement percentage rate associated with proceeding with the reimbursement co-op process. In FIG. 4, the reimbursement rate for the reimbursement co-op process is shown as 50%. In the same web page 400, the web portal may display information relating to the co-pay co-op process. For example, in web page 400, such information indicates that if the second user 110 selects the co-pay co-op process, then there are no forms to fill out, marketing content is already pre-approved by the brand, and that reimbursement savings are applied instantly. Additionally, the web page 400 may indicate the reimbursement percentage rate associated with proceeding with the co-pay co-op process. In FIG. 4, the reimbursement rate for the co-pay co-op process is shown as 75%.

FIG. 5 provides a web page 500 that illustrates a drop-down menu including a list of sample order types that the second user 110 may select from so that the second user 110 may see the comparison between the traditional reimbursement co-op process versus the co-pay co-op process for the selected order type. Order types may include, but are not limited to, a call tracking order (e.g. can be used to monitor whether calls come in from customers based on advertising performed by the marketing partner), a co-op order, a community outreach order (i.e. advertising related to community outreach), a custom advertisements order, a direct mail order, a download center order (e.g. download center may store various types of media content for advertising), an email order (i.e. email advertising), a local public relations order, a marketing program order, an outdoor advertising order, an order for purchasing a list, a radio advertising order, a "ship to your door" order, a social media advertising order, a television advertising order, any other type of order, or any combination thereof. In web page 500, the second user may choose to select a direct mail marketing program from the list of order types. After selecting the direct mail marketing program from the list of order types, web page 600 as shown in FIG. 6, may be displayed on the second user device 111. Web page 600 may indicate comparison information for the traditional reimbursement co-op process versus the co-pay co-op process specifically for the selected direct mail order type. Additionally, web page 600 may allow the second user 110 to select an option to view all direct mail marketing materials made available by the brand as well. The second user 110 can either proceed to view the direct mail marketing materials or select a different order type from the list of order types shown in the drop down menu in web page 500 to see a different comparison.

The third user 115, who may be a representative of a second marketing partner, may similarly want to perform advertising and/or marketing activities on behalf of the same brand, and may access the web portal via third user device 116 to participate in either the traditional reimbursement co-op process or the co-pay co-op process. The third user 115 may access web page 700 as shown in FIG. 7, which may be the same or similar web page as web page 300. In an example scenario, the third user 115 may opt to select the traditional reimbursement co-op process and submit a claim for reimbursement. In such a scenario, the web portal may display web page 800, as shown in FIG. 8, so as to obtain all the details relating to the claim that the third user 115 wants reimbursed for the second marketing partner. For example, web page 800 may request the third user 115 to input a name for the reimbursement request, a vendor name associated with the claim, an invoice number, an invoice date, an indication as to the type of advertising or activity performed on behalf of the brand, the dates that the advertising occurred and/or the activity was performed, the invoice amount, the claimed amount, a fund to apply towards the reimbursement, among other fields as illustrated in web page 800. Additionally, the web portal may enable the third user 115 to upload a copy of the invoice, along with any comments, into the web portal via web page 800.

Once the third user 115 inputs the details relating to the claim for reimbursement, the web portal may display web page 900, as shown in FIG. 9. Web page 900 may display a summary of all the details relating to the claim for reimbursement. In web page 900, for example, the summary may indicate a status relating to the reimbursement, which in this case may indicate that the reimbursement claim was approved, the reimbursement was paid, and that the check for the reimbursement has cleared. If the reimbursement claim is denied, as shown in FIG. 10, the web page 1000 may be displayed. Web page 1000 may provide a status indicator indicating that the reimbursement request was denied, along with an identification of changes to the reimbursement request that need to be made by the third user 115 to get the reimbursement claim approved. The web page 1000 may include an editing function to enable the third user 115 to make any necessary changes to the reimbursement request. Either web page 900 or web page 1000 may enable the third user 115 to see a history relating to the reimbursement requests made by the third user 115. For example, in the web page 1100, as shown in FIG. 11, a detailed history relating to reimbursement requests is shown. In web page 1100, it shows that a first reimbursement request has already been paid, a second reimbursement request has been approved to be paid, a third reimbursement request was denied and is pending, and a fourth reimbursement request is awaiting approval.

Figure 13:
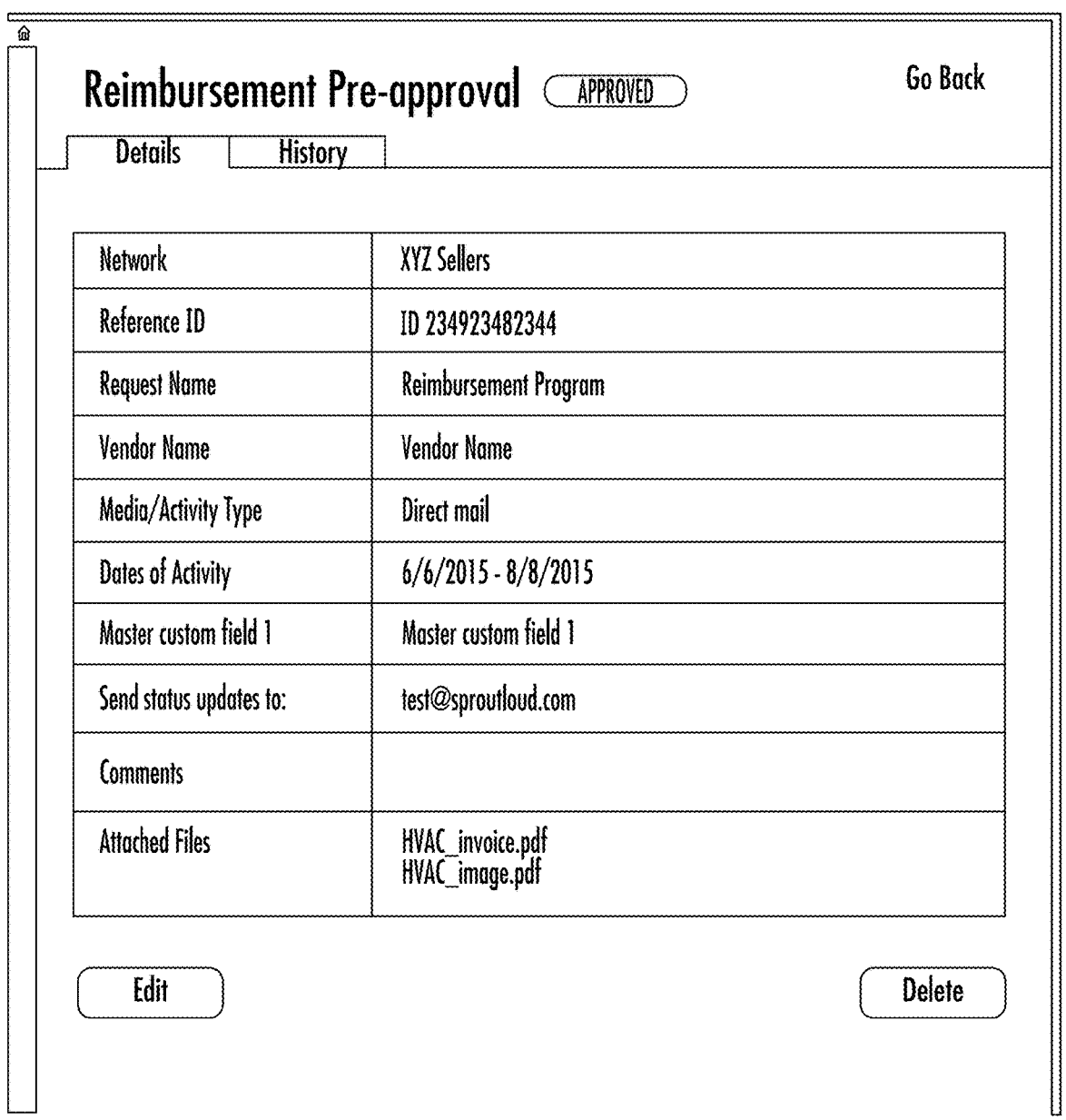
FIG. 13 is a web page illustrating details relating to a marketing activity that has been approved by a brand in response to a request for pre-approval made by a marketing partner.

In another example scenario, the third user 115 may opt to submit a pre-approval request to obtain approval for marketing activities before they are performed so that the third user 115 will know that the second marketing partner will be reimbursed. In this scenario, the third user 115 may select the option to submit the pre-approval request from web page 700 and the web portal may then display web page 1200, as shown in FIG. 12. Web page 1200 may include a series of input boxes that request the third user 115 to input a name for the request, a vendor name, an identification of the type of advertising media and/or activity to be performed, the dates of performance of the marketing activity, along with any other additional information. Web page 1200 may also enable the third user 115 to upload files (e.g. advertising content, invoice forms, etc.) relating to the pre-approval request, along with any comments. Once the third user 115 fills out the form from web page 1200, the web portal may generate web page 1300, as shown in FIG. 13, to display a summary of the details relating to the pre-approval request. Web page 1300 may give the option to either delete the pre-approval request or edit the pre-approval request. Web page 1300 may also show the approval status, and, in this case, the status indicates that the pre-approval request was approved. If the pre-approval request is not approved, web page 1400, as shown in FIG. 14, may be displayed to the third user 115. Web page 1400 may provide a status indicator that indicates that the pre-approval request has been denied pending modifications to the request made by the third user 115. The web page 1400 may include comments that provide instructions to the third user 115, which indicate how the third user 115 may modify the previous pre-approval request so that it will be approved.

In certain embodiments, the second user 110 and/or the third user 115 may be presented with web page 1500, as shown in FIG. 15. Web page 1500 may enable the second and/or third users 110, 115 to request incremental funds. Much like the other web pages of the web portal, web page 1500 may require the second and/or third user 110, 115 to input a name for the request for incremental funds, input a vendor name, input a media/activity type, input the dates that the activities have been performed or will be performed, input the amount of funds being requested, input any other additional information, along with any comments. In certain embodiments, the web portal may allow the second and/or third users 110, 115 to access web page 1600, as shown in FIG. 16. Web page 1600 may include a detailed history of reimbursement requests, co-op fund requests, and pre-approval requests. For example, web page 1600 may include a list of all reimbursement requests submitted by the second user 110. The list may include the request name, the request type, the submission date for the request, the total amount spent on the performing the marketing activity, the amount of funds requested, and the status of the request itself.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, integrating and/or incorporating one or more reimbursement or other co-op processes into a software platform; providing a first option to participate in a reimbursement co-op process to obtain a reimbursement of a claim for a first marketing activity and/or to request pre-approval for one or more other marketing activities; providing a first percentage rate for using the reimbursement co-op process for the reimbursement of the claim associated with the first marketing activity for the brand; providing a second option to participate in a co-pay co-op process associated with performing a second marketing activity that is pre-approved by the brand; providing a second percentage rate associated with reimbursement for performing the second marketing activity using the co-pay co-op process; causing a marketing partner to participate in either the reimbursement co-op process or the co-pay co-op process based on either selection of the first or second option respectively; approving or rejecting a claim associated with the first marketing activity; automatically provided access to marketing funds corresponding to the second percentage rate if the second option is selected; and performing any other suitable operations conducted in the system 100 or otherwise. In one embodiment, multiple servers 160 may be utilized to process the functions of the system 100. The server 160 and other devices in the system 100 may utilize the database 155 for storing data about the devices in the system 100 or any other information that is associated with the system 100. In one embodiment, multiple databases 155 may be utilized to store data in the system 100.

Although FIG. 1 illustrates a specific example configuration of the various components of the system 100 the system 100 may include any configuration of the components, which may include using a greater or lesser number of the components. For example, the system 100 is illustratively shown as including a first user device 102, a second user device 111, a third user device 116, a communications network 135, a core engine 138, a server 140, a server 145, a server 160, and a database 155. However, the system 100 may include multiple first user devices 102, multiple second user devices 111, multiple third user devices 116, multiple communications networks 135, multiple core engines 138, multiple servers 140, multiple servers 145, multiple servers 160, multiple databases 155, or any number of any of the other components in the system 100. Furthermore, in certain embodiments, substantial portions of the functionality and operations of the system 100 may be performed by other networks and systems that may be connected to system 100.

Figure 17:
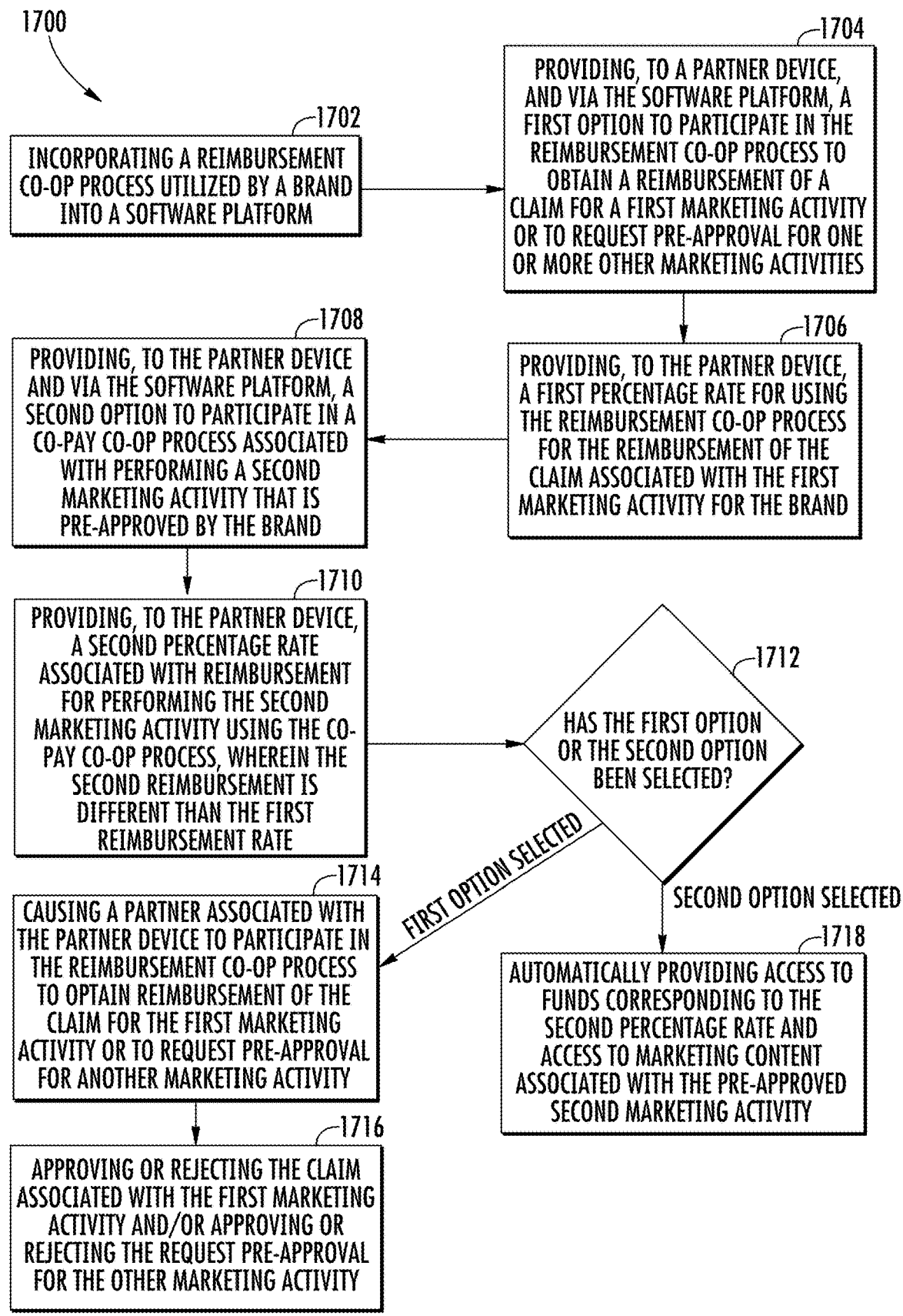
FIG. 17 is a flow diagram illustrating a sample method for facilitating a marketing partner's transition from a reimbursement co-op model to a co-pay co-op model according to an embodiment of the present disclosure.

As shown in FIG. 17, an exemplary method 1700 for facilitating the transition from a traditional reimbursement co-op model to a co-pay co-op model is schematically illustrated, and may include, at step 1702, integrating and/or incorporating a reimbursement co-op process utilized by a brand into a software platform. For example, an existing reimbursement co-op software process (e.g. software) that is utilized by the brand may be integrated into a software platform that implements a co-pay co-op process that may be utilized by the brand. In certain embodiments, the integrating of the reimbursement co-op process may be performed by utilizing the first user device 102, the second user device 111, the third user device 116, the server 140, the server 145, the server 160, the communications network 135, any combination thereof, or by utilizing any other appropriate program, network, system, or device. At step 1704, the method 1700 may include providing, to a partner device (e.g. second user device 111 or third user device 116) and via the software platform, a first option to participate in the reimbursement co-op process to obtain a reimbursement of a claim for a first marketing activity or to request pre-approval for one or more other marketing activities. The partner device may be associated with a marketing partner of the brand, and the reimbursement co-op process may be a process that the marketing partner is already familiar with and has utilized in the past. The first option may be provided, for example, via a web page of a web portal of the brand, a graphical user interface of a software application, or combination thereof. In certain embodiments, the first option may be provided by utilizing the first user device 102, the second user device 111, the third user device 116, the server 140, the server 145, the server 160, the communications network 135, any combination thereof, or by utilizing any other appropriate program, network, system, or device.

At step 1706, the method 1700 may include providing, to the partner device, a first percentage rate for using the reimbursement co-op process for the reimbursement of the claim associated with the first marketing activity performed for the brand. The first percentage rate may be a percentage of marketing funds that the brand is willing to reimburse to a partner (e.g. partners 110, 115) in exchange for the partner performing the first marketing activity. In certain embodiments, the providing may be performed by utilizing the first user device 102, the second user device 111, the third user device 116, the server 140, the server 145, the server 160, the communications network 135, any combination thereof, or by utilizing any other appropriate program, network, system, or device. At step 1708, the method 1700 may include providing, to the partner device and via the software platform, a second option to participate in a co-pay co-op process associated with performing a second marketing activity that is already pre-approved by the brand. For example, the second option may be presented side-by-side with the first option on the web page of the web portal of the brand. In certain embodiments, the second marketing activity may be the same marketing activity as the first marketing activity, and, in other embodiments, the second marketing activity may be a marketing activity that is different from the first marketing activity. In certain embodiments, the second option may be provided by utilizing the first user device 102, the second user device 111, the third user device 116, the server 140, the server 145, the server 160, the communications network 135, any combination thereof, or by utilizing any other appropriate program, network, system, or device.

At step 1710, the method 1700 may include providing, to the partner device, a second percentage rate associated with reimbursement for performing the second marketing activity using the co-pay co-op process. The second percentage rate may be a percentage of funds that the brand is willing to reimburse to a partner in exchange for performing the second marketing activity. In certain embodiments, the second percentage rate may be higher than the first percentage rate so as to incentivize a marketing partner to select the second option. In certain embodiments, the second percentage rate may simply be a rate provided for the co-pay co-op process that is different from the first percentage rate provided for the reimbursement co-op process. In certain embodiments, the second percentage rate may be provided by utilizing the first user device 102, the second user device 111, the third user device 116, the server 140, the server 145, the server 160, the communications network 135, any combination thereof, or by utilizing any other appropriate program, network, system, or device. At step 1712, the method 1700 may include determining whether the first option or the second option has been selected by the partner device. In certain embodiments, a marketing partner utilizing the partner device may select either the first option or the second option via a user interface of a web portal implemented by the software platform that is displayed on a screen of the partner device. In certain embodiments, the determining may be performed by utilizing the first user device 102, the second user device 111, the third user device 116, the server 140, the server 145, the server 160, the communications network 135, any combination thereof, or by utilizing any other appropriate program, network, system, or device.

If, at step 1712, the first option is selected, the method 1700 may proceed to step 1714. At step 1714, the method 1700 may include causing the marketing partner associated with the partner device to participate in the reimbursement co-op process so as to obtain a reimbursement for a claim associated with performing the first marketing activity or to enable the marketing partner to request pre-approval for another marketing activity. At step 1714, the reimbursement co-op process may be started and the marketing partner may be requested to input information identifying the details relating to the reimbursement claim for the first marketing activity and/or requested to upload one or more marketing materials associated with other marketing activities for pre-approval. In certain embodiments, the marketing partner may be caused to participate in the reimbursement co-op process by utilizing the first user device 102, the second user device 111, the third user device 116, the server 140, the server 145, the server 160, the communications network 135, any combination thereof, or by utilizing any other appropriate program, network, system, or device. At step 1716, the method 1700 may include approving or rejecting any reimbursement claim for the first marketing activity made by the marketing partner utilizing the partner device and/or approving or rejecting the request for pre-approval for the other marketing activity. In certain embodiments, the approving and/or rejecting may be performed by utilizing the server 140, the server 145, the server 160, the communications network 135, any combination thereof, or by utilizing any other appropriate program, network, system, or device. If the reimbursement claim is rejected, the method 1700 may include enabling the marketing partner to resubmit the claim with additional information and/or enabling the marketing partner to submit different marketing materials for pre-approval. Once the reimbursement claim is approved and/or the marketing materials are approved, the marketing partner may proceed via the reimbursement co-op process/model.

If, however, at step 1712, the second option is determined to have been selected, the method 1700 may include proceeding to step 1718. At step 1718, the method 1700 may include providing the marketing partner with automatic access to marketing funds according to the second percentage rate and with access to marketing content associated with the pre-approved second marketing activity. In certain embodiments, at step 1718, the brand may immediately reimburse the marketing partner according to the second percentage rate. For example, the marketing partner may pay for the entire expenses upfront, but the marketing partner may be reimbursed immediately in real-time based on electronic funds accessible via the web portal according to the second percentage rate. In certain embodiments, at step 1718, the brand may simply pay its share of the expenses associated with the second marketing activity upfront and the marketing partner may pay its share of the expenses upfront based on the second percentage rate. For example, if the co-pay co-op reimbursement rate is 75%, the marketing partner may pay 25% up front and the brand may pay 75% up front. Also, at step 1718, the marketing partner may proceed via the co-pay co-op process/model instead of the reimbursement co-op process. In certain embodiments, the access to the marketing funds and/or access to the marketing content may be provided by utilizing the server 140, the server 145, the server 160, the communications network 135, any combination thereof, or by utilizing any other appropriate program, network, system, or device. In certain embodiments, the aforementioned version of step 1702 of the method 1700 may be adjusted. For example, instead of incorporating the reimbursement co-op process that is utilized by the brand into the software platform, the method 1700 may include simply incorporating any type of reimbursement co-op process that the marketing partner is familiar with. In certain embodiments, the method 1700 may start at step 1704 or at step 1706. Notably, the method 1700 may further incorporate any of the functionality and features as described for system 100 or as otherwise described herein.

Notably, the system 100 and methods disclosed herein may include additional functionality and features. For example, in certain embodiments, the software platform may determine performance metrics associated with advertising conducted via the co-pay co-op process, the traditional reimbursement co-op process, or a combination thereof. For example, for all orders placed on the web portal for marketing programs and/or materials via the co-pay co-op process, the software platform can monitor how often a particular type of marketing program is ordered by the marketing partners, which marketing programs resulted in calls from customers enquiring about the brand's products, the number of calls coming in from customers, the number of calls coming in from customers that resulted in sales, which marketing programs resulted in the most calls from customers, which marketing programs results in the most sales for the brand, which marketing programs resulted in the most clicks on the brands website from potential customers, any other performance information, or any combination thereof.

The information gathered from the monitoring may be stored in database 155 and may be utilized to adjust the percentages of reimbursement or may be utilized to provide other incentives to marketing partners for certain types of marketing programs. For example, if the monitoring indicates that social media advertising programs are ordered at a very high frequency when compared with television advertising programs, the software platform may adjust the reimbursement percentage provided for the social media advertising programs to a higher rate than the reimbursement percentage providing for the television advertising programs. As another example, if direct mail advertising ordered via the co-pay co-op process results in fewer sales than email advertising ordered via the co-pay co-op process, the software platform may reduce the reimbursement rate percentage for the direct mail advertising and increase the reimbursement rate for the email advertising.

In certain embodiments, other incentives may be provided to marketing partners. For example, based on the level of participation in the co-pay co-op process (e.g. how often the marketing partner orders marketing programs via the co-pay co-op process), the software platform may provide a particular marketing partner with access to a greater number of marketing programs compared to other marketing partners that have a lower level of participation. In certain embodiments, marketing partners with higher levels of participation may be provided with higher reimbursement rates than marketing partners with lower levels of participation. In certain embodiments, marketing partners with higher levels of participation may be granted access to the latest and newest marketing programs before marketing partners with lower levels of participation. Any metric may be utilized to determine whether or not to give incentives to a particular marketing partner. For example, if a certain marketing partner generates more sales for the brand than another marketing partner based on the marketing programs ordered via the co-pay co-op process, the marketing partner with the greater sales may be provided with increased incentives.

The systems and methods disclosed herein may include further functionality and features. For example, the operative functions of the system 100 and method may be configured to execute on a special-purpose processor specifically configured to carry out the operations provided by the system 100 and method. Additionally, the system 100 and method is not limited to operating in the marketing context. In certain embodiments, the system 100 and methods may be utilized to facilitate the transition between any types of business processes, computing processes, other processes, or any combination thereof. For example, the system 100 and method may be utilized to facilitate the transition from using one type of internet connectivity service to a newer, more robust internet connectivity service, or to a different type of internet connectivity service. As another example, the system 100 and method may be utilized to facilitate the transition from using a first type of web service for providing various functionality to a second type of web service that either provides the same functionality as the first type of web service in a different or more efficient way, or provides different functionality from the first type of web service. As a further example, the system 100 and method may be utilized to facilitate the transition from using a first type of hardware device to a second type of hardware device, which may have more efficient and powerful security systems, programs, and/or components than the first device.

Notably, the operative features and functionality provided by the system 100 and method may increase the efficiency of computing devices that are being utilized to facilitate the functionality provided by the system 100 and method. For example, through the use of the integrated software platform that integrates both the reimbursement co-op process and the co-pay co-op process within a single software platform, fewer amounts of processor and memory resources need to be utilized than if the processes were executed on separate software platforms. In such a context, less processing power needs to be utilized because the processors and memories do not need to be dedicated to multiple software platforms, which would require greater processor and memory usage. As a result, there are substantial savings in the usage of computer resources by utilizing the software and algorithms provided in the present disclosure as compared with previously existing technologies.

Notably, in certain embodiments, various functions and features of the system 100 and methods may operate without any human intervention and may be conducted entirely by computing devices. For example, the selection of the first option to proceed with the reimbursement co-op process or the selection of the second option to proceed with the co-pay co-op process may be automated based on one or more rules specified by the marketing partner or even the brand. A rule may indicate under what conditions the first or second option should be selected. The rule may indicate what type of co-op process may be selected, what types of marketing programs or content may be selected, or any other restriction. In certain embodiments, multiple computing devices may interact with devices of the system 100 to facilitate the transition between a reimbursement co-op process and a co-pay co-op process, facilitate the transition between one software process to a second software process, facilitate the transition between using one hardware device to using a second hardware device, or any combination thereof. Additionally, the computing devices of the system 100 may operate continuously and without human intervention to reduce the possibility of errors being introduced into the system 100.

In certain embodiments, the system 100 and methods may also provide effective computing resource management by utilizing the features and functions described in the present disclosure. For example, in certain embodiments, upon receiving selection of the first option to participate in the reimbursement co-op process, any selected device in the system 100 may transmit a signal to a computing device receiving or processing the selection that only a specific quantity of computer processor resources (e.g. processor clock cycles, processor speed, etc.) may be devoted to the reimbursement co-op software processes and functionality. For example, the signal may indicate a specific quantity or threshold of processor cycles of a processor may be utilized to process the reimbursement co-op process, and/or specify a selected amount of processing power that may be dedicated to processing the reimbursement co-op process or any of the operations performed by the system 100. In certain embodiments, the signal indicating the specific quantity or threshold of computer processor resources or computer memory resources to be utilized for performing an operation of the system 100 may be transmitted from the web portal to any appropriate device of the system 100. In certain embodiments, an administrator of the web portal may select the quantity of processing and/or memory resources to be utilized for a particular operation via an option in the web portal. As another example, in certain embodiments, upon receiving selection of the second option to participate in the co-pay co-op process, any selected device in the system 100 may transmit a signal to a computing device receiving or processing the selection that a greater quantity of computer processor resources (e.g. processor clock cycles, processor speed, etc.) may be devoted to the co-pay co-op software processes than to reimbursement co-op software processes and functionality. For example, the signal may indicate a quantity of processor cycles of a processor may be utilized to process the co-pay co-op process functionality above and beyond those that would be used for the reimbursement co-op process, and/or specify a selected amount of processing power that may be dedicated to processing the co-pay co-op process or any of the operations performed by the system 100. By providing greater computing resources to the co-pay co-op process versus the reimbursement co-op processes, this can serve as a further incentive to transition from the reimbursement co-op process to the co-pay co-op process.

In certain embodiments, a device processing the processes of the system 100 may receive a signal from any device in the system 100 instructing the device to use only a cache or specific sectors of a cache of the processor of the device to process and store inputs or data instead of utilizing separate memory and storage devices. In certain embodiments, when an input is received, when calculating performance metrics, or when performing any other operation of the system 100, any selected device in the system 100 may transmit a signal to a memory device storing the data that only certain sectors of the memory of the memory device may be utilized during such operations. In certain embodiments, any selected device in the system 100 may transmit a signal to a memory device to cause the memory device to only dedicate a selected amount of memory resources to the calculation operation or to other operations of the system 100. In certain embodiments, the system 100 and methods may also include transmitting signals to processors and memories to only perform the operative functions of the system 100 and methods at time periods when usage of processing resources and/or memory resources in the system 100 is below or at a threshold value. In certain embodiments, the system 100 and methods may include transmitting signals to the memory devices utilized in the system 100, which indicate which specific portions/sectors of the memory should be utilized to store any of the data utilized or generated by the system 100, such as content of the web portal (e.g. marketing programs, etc.), performance metrics, reimbursement co-op information, co-pay co-op information, any other information or content, or any combination thereof. Notably, the signals transmitted to the processors and memories may be utilized to optimize the usage of computing resources while executing the operations conducted by the system 100. For example, when calculating performance metrics, it may be specified that x processing resources should be dedicated to the calculating performance metrics, however, when processing the co-pay co-op process, x+y processing resources should be dedicated to processing any operation associated with the co-pay co-op process. As a result, such features provide substantial operational efficiencies and improvements over existing technologies, particularly from a computing perspective.

Figure 18:
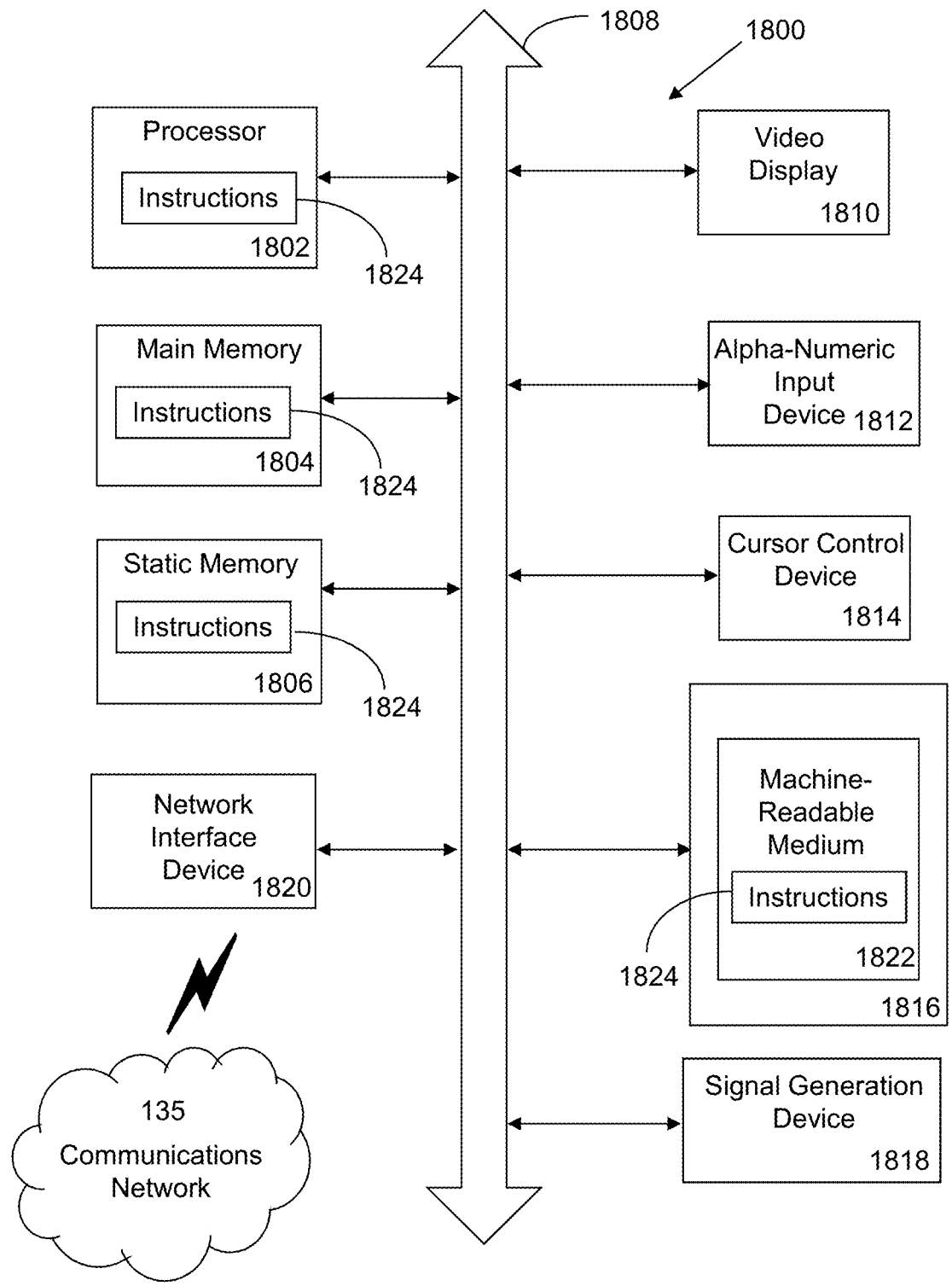
FIG. 18 is a schematic diagram of a machine in the form of a computer system within which a set of instructions, when executed, may cause the machine to perform any one or more of the methodologies or operations of the systems and methods for facilitating a marketing partner's transition from a reimbursement co-op model to a co-pay co-op model.

Referring now also to FIG. 18, at least a portion of the methodologies and techniques described with respect to the exemplary embodiments of the system 100 can incorporate a machine, such as, but not limited to, computer system 1800, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the third user device 116, the core engine 138, the server 140, the server 145, the database 155, the server 160, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1800 may include a processor 1802 (e.g., a central processing unit (CPU), a graphics processing unit (GPU, or both), a main memory 1804 and a static memory 1806, which communicate with each other via a bus 1808. The computer system 1800 may further include a video display unit 1810, which may be, but is not limited to, a liquid crystal display (LCD), a flat panel, a solid state display, or a cathode ray tube (CRT). The computer system 1800 may include an input device 1812, such as, but not limited to, a keyboard, a cursor control device 1814, such as, but not limited to, a mouse, a disk drive unit 1816, a signal generation device 1818, such as, but not limited to, a speaker or remote control, and a network interface device 1820.

The disk drive unit 1816 may include a machine-readable medium 1822 on which is stored one or more sets of instructions 1824, such as, but not limited to, software embodying any one or more of the methodologies or functions described herein, including those methods illustrated above. The instructions 1824 may also reside, completely or at least partially, within the main memory 1804, the static memory 1806, or within the processor 1802, or a combination thereof, during execution thereof by the computer system 1800. The main memory 1804 and the processor 1802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 1822 containing instructions 1824 so that a device connected to the communications network 135, another network, or a combination thereof, can send or receive voice, video or data, and to communicate over the communications network 135, another network, or a combination thereof, using the instructions. The instructions 1824 may further be transmitted or received over the communications network 135, another network, or a combination thereof, via the network interface device 1820.

While the machine-readable medium 1822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device, or "computer-readable device" shall accordingly be taken to include, but not be limited to: memory devices, solid-state memories such as a memory card or other package that houses one or more read-only (non-volatile) memories, random access memories, or other rewritable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

I claim:

1. A system, comprising:
   a memory that stores instructions; and
   a processor that executes the instructions to perform operations, the operations comprising:
   incorporating, into a software platform, a reimbursement co-op process utilized by a brand;
   providing, to a partner device and via the software platform, a first option to participate in the reimbursement co-op process so as to obtain a reimbursement of a claim associated with performing a first marketing activity for the brand;
   providing, to the partner device, a first percentage rate for the reimbursement of the claim associated with performing the first marketing activity for the brand for the reimbursement co-op process;
   providing, to the partner device and via the software platform, a second option to participate in a co-pay co-op process associated with performing a second marketing activity that is pre-approved by the brand, wherein the second marketing activity is either the first marketing activity or a different marketing activity, wherein the co-pay co-op process enables the partner device to proceed with the second marketing activity without submitting a claim submission or a request for pre-approving marketing content;
   providing, to the partner device, a second percentage rate associated with reimbursement for performing the second marketing activity that is pre-approved by the brand for the co-pay co-op process, wherein the second percentage rate is different than the first percentage rate;
   receiving, from the partner device, a selection of the first option or the second option; and
   generating, if the partner device is participating in the reimbursement co-op process, a signal indicating that a greater amount of processing resources is dedicated to a first software process associated with the co-pay co-op process than a second software process associated with the reimbursement co-op process so as to facilitate transitioning from the second software process to the first software process.

2. The system of claim 1, wherein the operations further comprise providing, with the first option, a third option for submitting a pre-approval request associated with performing the first marketing activity for the brand for the reimbursement co-op process.

3. The system of claim 2, wherein the operations further comprise providing, in response to receiving the pre-approval request, an approval for a partner associated with the partner device to perform the first marketing activity for the brand.

4. The system of claim 1, wherein the operations further comprise automatically providing, if the second option to participate in the co-pay co-op process is selected by the partner device, access to funds based on the second percentage rate associated with performing the second marketing activity.

5. The system of claim 1, wherein the operations further comprise causing, if the first option to participate in the reimbursement co-op process is selected by the partner device, a partner associated with the partner device to participate in the reimbursement co-op process.

6. The system of claim 1, wherein the operations further comprise presenting, via the software platform, a comparison of the reimbursement co-op process with the co-pay co-op process.

7. The system of claim 1, wherein the operations further comprise incorporating the reimbursement co-op process into the software platform by accessing a software module that executes the reimbursement co-op process for the brand.

8. The system of claim 1, wherein the operations further comprise providing, to the partner device and via the software platform, a third option to transition to the co-pay co-op process if the partner device is already participating in the reimbursement co-op process.

9. The system of claim 1, wherein the operations further comprise providing an incentive to the partner device to select the second option to participate in the co-pay co-op process.

10. The system of claim 1, wherein the operations further comprise automatically granting, if the second option to participate in the co-pay co-op process is selected by the partner device, the partner device with access to the marketing content corresponding to the second marketing activity that is pre-approved by the brand.

11. The system of claim 1, wherein the operations further comprise calculating a performance metric associated with the second marketing activity that is pre-approved by the brand.

12. The system of claim 11, wherein the operations further comprise providing, to the partner device and via the software platform, a third option to participate in the co-pay co-op process, wherein the third option is associated with performing a third marketing activity that is pre-approved by the brand, wherein the third option is provided if the performance metric is below a threshold value.

13. A method, comprising:
  incorporating, into a software platform, a reimbursement co-op process utilized by a brand, wherein the incorporating is performed by utilizing instructions from a memory that are executed by a processor;
  providing, to a partner device and via the software platform, a first option to participate in the reimbursement co-op process so as to obtain a reimbursement of a claim associated with performing a first marketing activity for the brand;
  providing, to the partner device, a first percentage rate for the reimbursement of the claim associated with performing the first marketing activity for the brand for the reimbursement co-op process;
  providing, to the partner device and via the software platform, a second option to participate in a co-pay co-op process associated with performing a second marketing activity that is pre-approved by the brand, wherein the second marketing activity is either the first marketing activity or a different marketing activity, wherein the co-pay co-op process enables the partner device to proceed with the second marketing activity without submitting a claim submission or a request for pre-approving marketing content;
  providing, to the partner device, a second percentage rate associated with reimbursement for performing the second marketing activity that is pre-approved by the brand for the co-pay co-op process, wherein the second percentage rate is different than the first percentage rate;
  receiving, from the partner device, a selection of the first option or the second option; and
  facilitating transitioning from a first software process associated with a reimbursement co-op process to a second software process associated with the co-pay co-op process based on a signal indicating an amount of processing resources dedicated to the first and second software processes respectively.

14. The method of claim 13, further comprising adjusting the second percentage rate based on a performance metric associated with the second marketing activity that is pre-approved by the brand.

15. The method of claim 13, further comprising transmitting, to the partner device, a message including an incentive to select the second option to participate in the co-pay co-op process.

16. The method of claim 13, further comprising causing the first option and the second option to be displayed simultaneously on a graphical user interface of the partner device.

17. The method of claim 13, further comprising providing, with the first option, a third option for submitting a pre-approval request associated with performing the first marketing activity for the brand.

18. The method of claim 13, further comprising presenting, via the software platform, a comparison of first features of the reimbursement co-op process with second features of the co-pay co-op process.

19. The method of claim 13, further comprising adjusting an allocation of funds for the second marketing activity based on sales generated by performance of the second marketing activity.

20. A computer-readable device comprising instructions, which when executed by a processor, cause the processor to perform operations comprising:
  incorporating, into a software platform, a reimbursement co-op process utilized by a brand;
  providing, to a partner device and via the software platform, a first option to participate in the reimbursement co-op process so as to obtain a reimbursement of a claim associated with performing a first marketing activity for the brand;
  providing, to the partner device, a first percentage rate for the reimbursement of the claim associated with performing the first marketing activity for the brand for the reimbursement co-op process;
  providing, to the partner device and via the software platform, a second option to participate in a co-pay co-op process associated with performing a second marketing activity that is pre-approved by the brand, wherein the second marketing activity is either the first marketing activity or a different marketing activity, wherein the co-pay co-op process enables the partner device to proceed with the second marketing activity without submitting a claim submission or a request for pre-approving marketing content;

providing, to the partner device, a second percentage rate associated with reimbursement for performing the second marketing activity that is pre-approved by the brand for the co-pay co-op process, wherein the second percentage rate is different than the first percentage rate;

receiving, from the partner device, a selection of the first option or the second option; and facilitating transitioning from a first software process associated with a reimbursement co-op process to a second software process associated with the co-pay co-op process based on a signal indicating an amount of processing resources dedicated to the first and second software processes respectively.

\* \* \* \* \*